Sept. 20, 1960 O. F. GERKENSMEIER 2,953,646

BALANCED IMPULSER CIRCUIT

Filed March 10, 1958

INVENTOR
O. F. GERKENSMEIER
BY R. B. Ardis
ATTORNEY

United States Patent Office 2,953,646

Patented Sept. 20, 1960

2,953,646

BALANCED IMPULSER CIRCUIT

Otto F. Gerkensmeier, New York, N.Y., assignor to Bell Telephone Laboratories, Incorporated, New York, N.Y., a corporation of New York Filed Mar. 10, 1958, Ser. No. 720,497

4 Claims. (Cl. 179—16)

This invention relates to transmission systems and more particularly to panel call indicator signaling systems.

Briefly, in a panel call indicator system, digital information is conveyed from an impulser circuit to a receiver circuit by transmitting pulses of varying current level and polarity over interconnecting line conductors to operate sensitive polarized or marginal relays in the receiving circuit. As is well known in the art, the panel call indicator code consists of various combinations of pulses of different polarity and magnitude, each combination representing a particular decimal digit (see, for example, United States Patent No. 1,438,743 which issued to E. H. Clark on December 12, 1922). Such a combination consists of four sequentially transmitted pulses, usually the first and third of which are either light positive or so-called blank pulses and the second and fourth of which are either light or heavy negative pulses.

It has been found that present panel call indicator systems tend to be unduly susceptible to extraneous alternating-current voltages induced in the system line conductors. When, for example, a light negative pulse is transmitted in such a system, it has been found that an induced extraneous potential of as little as 6 volts (root mean square) can result in malfunctioning of the system receiving equipment.

It is accordingly a principal object of this invention to eliminate the undesirable effects of spurious signals that are induced in the line conductors of panel call indicator systems; that is, to eliminate signaling failures due to these spurious signals.

In accordance with the invention, various combinations of pulse-characterizing resistors for limiting the flow of the pulse current over the line loop are preselected and inserted in the loop by coordinated relay circuits so that the loop is balanced insofar as longitudinal currents are concerned. As will become apparent in the discussion which follows, a panel call indicator signaling system arranged in accordance with this invention is virtually immune to alternating-current interference.

Figure 1:
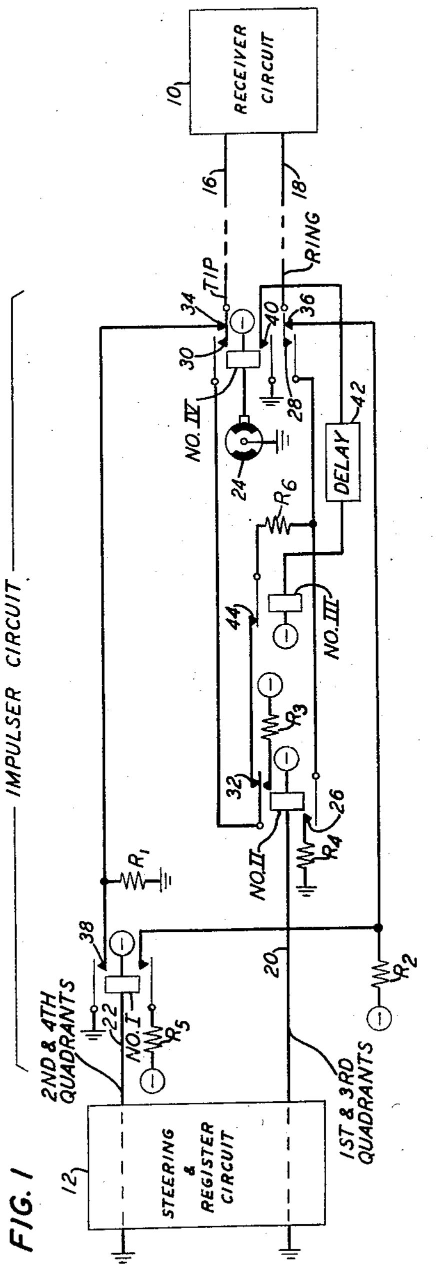
Figure 2:
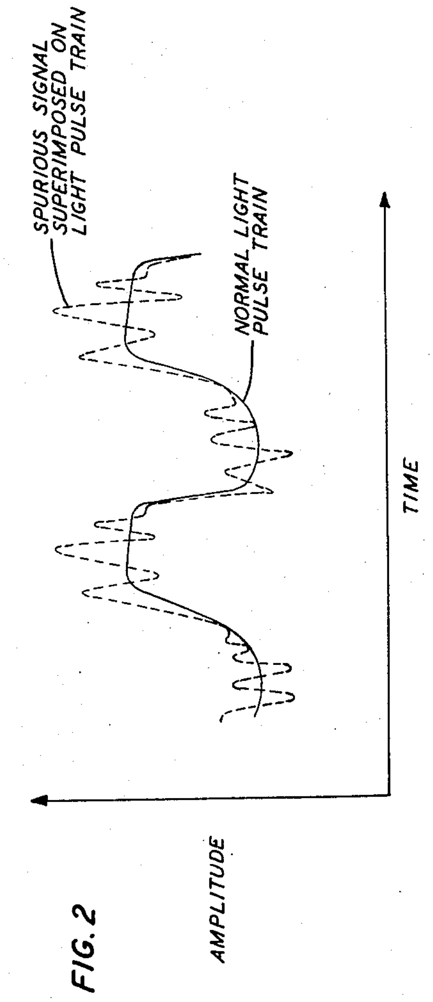

The invention will be understood more fully from the following more detailed description read in conjunction with the accompanying drawing in which:

Fig. 1 is a partial block diagram that shows a panel call indicator system arranged in accordance with the invention; and Fig. 2 is an oscillogram illustrating the distortion which can result in a typical prior art panel call indicator system when a spurious alternating-current signal of as little as 6 volts (root mean square) is induced in the line conductors of the system.

Each pulse group in a digit code of the type most commonly used in panel call indicator systems consists of four "quadrants" or "time slots," as pulse positions are often called in the electronics art. The first and third quadrants in such a code are reserved for information in the form of either so-called "blank pulses" (actually, these are not pulses at all) or "light" (relatively small in magnitude) positive pulses. The second and fourth quadrants are used for transmitting information in the form of either "light" or "heavy" (relatively large in magnitude) negative pulses. Thus, by using various combinations of light positive, so-called "blank," light negative, and heavy negative pulses, a numerical or station's code, for example, may easily be devised for the identification of parties in a panel call indicator signaling system. For a similar code, see the above-cited Clark patent.

It should be noted at this point that "light" and "heavy" are relative terms. Whether a pulse will be "light" or "heavy" depends upon the amount of resistance which is selectively inserted in the signaling system. Thus, various combinations of the resistors $R_1$, $R_2$, $R_3$, $R_4$, $R_5$, and $R_6$ of Fig. 1 will cause light, heavy, or blank pulses to be transmitted to the receiver circuit 10.

In Fig. 1, the receiver circuit 10 has been shown in block form, since the description of its internal operation is not necessary for present purposes and is well known in the art. For such a description, however, one may refer, for example, to the above-cited Clark patent and United States Patent No. 1,751,263 which issued to O. Cesareo on March 18, 1930. The operation of the illustrative embodiment of Fig. 1 will be described by considering the generation and transmission of each of the various pulses which may be used in a digit code of the type mentioned above.

The signaling system of Fig. 1 may be a part of, for example, the crossbar telephone system disclosed in Patent No. 2,585,904 which issued to A. J. Busch on February 19, 1952. The transmission of pulses to the receiver circuit 10 in proper quadrants is controlled by the steering and register circuit 12 which, in turn, operates in accordance with the particular intelligence to be transmitted. The steering and register circuit 12 is well known in the art and may be, for example, of the type disclosed in the above-cited Busch patent (see Busch Figs. 221 through 226 and the section entitled "Transfer of Called Line Number to Sender," beginning at page 117). Any intelligence to be transmitted over the tip conductor 16 and the ring conductor 18 is transmitted in the form of a continuous train of pulse groups. Each of these pulse groups, as mentioned above, consists of four time slots or quadrants.

The oscillogram of Fig. 2 illustrates how serious alternating-current interference of relatively small potential can be in panel call indicator signaling systems of the type presently used. The solid trace is a light positive pulse in the absence of alternating-current interference, while the dotted trace is the same pulse with a superimposed spurious signal of only 6 volts root mean square. The distortion illustrated is sufficient to cause malfunctioning of sensitive relays (see, for example, the above-cited Clark patent) in the receiver circuit of prior art systems. It is a feature of this invention that such a marked improvement in discrimination against spurious signals is obtained that spurious voltages of as high as 75 volts root mean square can be induced in the line conductors of a panel call indicator signaling system without any malfunctioning of the receiver equipment.

In Fig. 1 the energization of relay No. II is controlled by steering and register circuit 12 by way of conductor 20. Conductor 20 is grounded at appropriate times depending upon the message to be transmitted but may be grounded only during the first and third quadrants of any particular pulse group. It will be seen that the energization of relay No. II is necessary for the production of a light positive pulse, and that the deenergization of this relay is necessary for the production of a "blank pulse." Thus, whether a light positive pulse or a "blank pulse" is to be transmitted in the first or third quadrants of any particular pulse group depends, respectively, upon whether or not conductor 20 of steering and register circuit 12 is connected to ground.

The energization of relay No. I is controlled by steering and register circuit 12 via conductor 22. Conductor 22 is grounded at appropriate intervals by circuit 12 in accordance with the message to be transmitted but may be grounded only during the second and fourth quadrants of any particular pulse group. It will be seen that the energization of relay No. I is a prerequisite for the production of a heavy negative pulse and that the deenergization of this relay is a prerequisite for the production of a light negative pulse. Thus, whether a heavy or a light negative pulse is to be transmitted in the second or fourth quadrants of any pulse group is dependent, respectively, on whether or not conductor 22 is connected to ground by steering and register circuit 12.

At this point it will be helpful to indicate the elements which must be inserted in series with the signal loop comprising the tip and ring conductors in order to produce the various types of pulses. Resistors $R_1$, $R_2$, $R_3$, and $R_4$ each have relatively large resistance values, while the resistance values of resistors $R_5$ and $R_6$ are relatively small. For purposes of this discussion, one source of negative potential is used throughout the illustrative embodiment.

For a blank pulse (first or third quadrant) the signal loop does not include the negative source of potential. No signal is transmitted by the impulser circuit to the receiver circuit 10. During the first small fraction of the "blank pulse," the loop includes the resistor $R_6$: (1) to decrease the dissipation of heavy pulse current in the contacts of relay No. IV, which current may have been manifest in the signal loop during the previous quadrant (second or fourth), and (2) to discharge residual energy stored in the capacity of the cable comprising the tip and ring conductors. The resistor $R_6$ has a resistance value substantially less than that of the relay coil windings (not shown) of receiver circuit 10 so that the residual energy stored in the cable capacity will be discharged through resistor $R_6$ rather than through the relays (not shown) of receiver circuit 10, since the latter might cause malfunctioning of the receiver equipment. During the remainder of the "blank pulse" the signal loop is open-circuited by the operation of relay No. III.

For a light negative pulse (second or fourth quadrant), the signal loop includes the resistors $R_1$ and $R_2$ and the source of negative potential. Resistor $R_1$ is connected between ground and the tip conductor 16, while resistor $R_2$ is connected between the ring ocnductor 18 and the source of negative potential. Because of the relatively large resistance value of the series combination of resistors $R_1$ and $R_2$, a negative pulse of relatively "light" potential is transmitted to the receiver circuit 10.

For a heavy negative pulse (second or fourth quadrant), the signal loop includes the source of operating potential and the relatively small resistor $R_5$. The tip conductor 16 is connected directly to ground while resistor $R_5$ is connected between the ring conductor 18 and the source of operating potential. Because of the relatively low impedance inserted in the signal loop by resistor $R_5$, a negative pulse of relatively "heavy" potential is transmitted to the receiver circuit 10.

Finally, for a light positive pulse (first or third quadrant), the signal loop includes the source of operating potential and the resistors $R_3$ and $R_4$. Resistor $R_4$ interconnects ground with the ring conductor 18, while resistor $R_3$ interconnects the tip conductor 16 and the source of operating potential. Because of the relatively large resistance value of the series combination of resistors $R_3$ and $R_4$, a positive pulse of relatively "light" potential is transmitted to the receiver circuit 10.

The manner in which the above elements are inserted in the signal loop to produce the various types of pulses will now be described.

Assuming that the pulse desired to be transmitted in the first or third quadrant of a particular group is a light positive pulse, steering and register circuit 12 will energize relay No. II by connecting the negative source of potential to ground. Relay No. IV is energized only during the time duration of the first and third quadrants, that is during the periods of blank or light positive pulses. The timed interrupter circuit 24 cyclically energizes relay No. IV by completing the coil circuit of the relay to ground. Circuit 24 may be, for example, a resistance-capacitance-timed relay. Thus, when relay No. II is energized by steering and register circuit 12, relay No. IV is also energized by the timed interrupter circuit 24. A circuit is thereby completed from the impulser circuit to the receiver circuit 10 via tip and ring conductors 16 and 18. More specifically, the circuit includes resistor $R_4$, contact 26 of relay No. II, contact 28 of relay No. IV, ring conductor 18, the coil windings (not shown) of the various relay circuits (not shown) in receiver circuit 10, tip conductor 16, contact 30 of relay No. IV, contact 32 of relay No. II and resistor $R_3$. In accordance with an important feature of the invention, the resistance values of resistors $R_3$ and $R_4$ are substantially equal so that tip conductor 16 and ring conductor 18 are balanced with respect to longitudinal currents.

Assume now that a light negative pulse is desired to be transmitted over the signaling system of Fig. 1. Light and heavy negative pulses, it will be recalled, are transmitted only in the second and fourth quadrants. During the second and fourth quadrants, relay No. IV is always deenergized, since this relay is energized by the interrupter circuit 24 only during the first and third quadrants. For the transmission of a light negative pulse, relay No. I is also deenergized as are relays Nos. II and III. In other words, the circuit condition required for the transmission of a light negative pulse is that which is shown in Fig. 1, since all the relays are these shown in their deenergized state. The specific elements making up the signal loop during the transmission of a light negative pulse are Resistor $R_1$, contact 34 of relay No. IV, tip conductor 16, the coil windings (not shown) of various relays in receiving circuit 10, ring conductor 18, contact 36 of relay No. IV, resistor $R_2$, and the source of negative potential. In accordance with the invention, resistors $R_1$ and $R_2$ have substantially identical values of resistance so that the tip and ring conductors 16 and 18 are longitudinally balanced and the undesirable affects of alternating-current interference on light positive pulses are virtually eliminated.

Assume now that it is desired to transmit a heavy negative pulse over the system of Fig. 1. Such a pulse may be transmitted only in the second and fourth quadrants. As mentioned in the case of the light negative pulse, relay No. IV is always deenergized during the second and fourth quadrants. In order to transmit the heavy negative pulse, relay No. I must be energized and this is accomplished by grounding conductor 22 via steering and register circuit 12. Another prerequisite for the transmission of a heavy negative pulse is that relay No. IV be deenergized. Now, tracing the circuit which is completed by the energization of relay No. I and deenergization of relay No. IV, it will be seen that this circuit includes contact 38 of relay No. I, contact 34 of relay No. IV, tip conductor 16, relay circuits (not shown) of receiver circuit 10, ring conductor 18, contact 36 of relay No. IV, and the parallel combination of resistors $R_5$ and $R_2$ interconnecting contact 36 of relay No. IV with the negative source of potential. It will be noted that the circuit thus traced is not longitudinally balanced in that the parallel combination of resistors $R_5$ and $R_2$ on the ring side of the system has no counterpart on the tip side of the system. Thus, the heavy negative pulse circuit is unbalanced. This unbalance, however, is of negligible consequence, as it will be remembered that the resistance value of $R_5$ (and even more so, the parallel combination of resistors $R_5$ and $R_2$) is relatively small. Because of this minor unbalance, an extremely large amount of alternating-current interference is required before the heavy negative pulse is affected. As a result, the heavy pulse circuit completed by the energization of relay No. I and the deenergization of relay No. IV is virtually immune to alternating-current interference.

Assume now that it is desired to transmit no pulse, i.e., a "blank pulse," to the receiver circuit 10. A blank pulse, it will be recalled, may be transmitted only in the first and third quadrants. For the transmission of a "blank pulse" it will be noted that relay No. II must be deenergized and that relay No. IV must be energized. When these prerequisites are met, for a small fraction of the first part of the quadrant (first or third), resistor $R_6$ is shunted across the tip and ring conductors. During this fraction of the quadrant resistor $R_6$ serves to discharge the cable capacity of the system. The charge on the cable capacity, if not otherwise controlled, tends to discharge through the receiving relays (not shown) of receiver circuit 10 and to operate these relays falsely. Moreover, resistor $R_6$ serves to decrease heavy pulse current (which may have been present in the previous quadrant) through the contacts of relay No. IV. When relay No. IV becomes energized, it will be noted that contact 40 is connected to ground, thus completing the circuit including the negative source of potential and the windings of relay No. III. Upon completion of this circuit, relay No. III is designed to be energized after a predetermined time delay. Delay circuit 42 has been shown merely to illustrate this delay feature of relay No. III. It should be noted that the delay elements associated with relay No. III ordinarily do not comprise a separate entity as illustrated by delay circuit 46 but, rather, are an integral part of relay No. III.

After the predetermined time delay has lapsed, relay No. III becomes energized and contact 44 is opened. The tip and ring conductors are then open-circuited, since resistor $R_6$ is no longer connected across them.

The following enumerated values of circuit elements of the illustrative embodiment of the invention may be taken as typical:

| | | |
|---|---|---|
| Resistor $R_1$ | ohms | 3200 |
| Resistor $R_2$ | do | 3200 |
| Resistor $R_3$ | do | 3200 |
| Resistor $R_4$ | do | 3200 |
| Resistor $R_5$ | do | 115 |
| Resistor $R_6$ | do | 100 |
| Approximate time delay of relay No. III | milliseconds | 20 |
| Negative source of potential | volts | 48 |

It is to be understood that the above-described arrangement is illustrative of the application of the principles of the invention. Numerous other arrangements may be devised by those skilled in the art without departing from the spirit and scope of the invention.

What is claimed is:

1. A panel call indicator signaling system comprising an impulser circuit and a receiver circuit interconnected by tip and ring conductors, said impulser circuit comprising: first, second, third, fourth, fifth, and sixth resistors; a source of operating potential; first, second, third and fourth pulsing relays; means effective when said relays are deenergized for connecting said tip conductor to ground through said first resistor and for connecting said ring conductor to said source of potential through said second resistor; means effective when said second and fourth relays are energized for connecting said tip conductor to said source of potential through said third resistor and for connecting said ring conductor to ground through said fourth resistor; means effective when said first relay is energized and said fourth relay is deenergized for connecting said tip conductor directly to ground and for connecting said ring conductor to said source of potential through said fifth resistor; and means effective when said second and third relays are deenergized and said fourth relay is energized for connecting said sixth resistor across said tip and ring conductors.

2. A signaling system in accordance with claim 1 in which said first and second resistors have substantially identical values of resistance and said third and fourth resistors have substantially identical values of resistance.

3. A signaling system in accordance with claim 1 in which said first, second, third and fourth resistors have substantially identical values of resistance.

4. In a telephone system, a signaling network comprising an impulser circuit and a receiver circuit interconnected by tip and ring conductors; said impulser circuit comprising: first, second, third, fourth, fifth, and sixth resistors; a source of operating potential; first, second, third, and fourth pulsing relays; a steering and register circuit for selectively operating said first and second relays; an interrupter circuit for cyclically energizing said fourth relay in synchronism with the energization or deenergization of said second relay, said third relay operating in response to the operative condition of said fourth relay after a predetermined time interval; means effective when said relays are deenergized for connecting said tip conductor to ground through said first resistor and for connecting said ring conductor to said source of potential through said second resistor; means effective when said second and fourth relays are energized for connecting said tip conductor to said source of potential through said third resistor and for connecting said ring conductor to ground through said fourth resistor; means effective when said first relay is energized and said fourth relay is deenergized for connecting said tip conductor directly to ground and for connecting said ring conductor to said source of potential through said fifth resistor; and means effective when said second and third relays are deenergized and said fourth relay is energized for connecting said sixth resistor across said tip and ring conductors; said last-named means ceasing to be effective, to so connect said sixth resistor, when said third relay becomes energized in response to the energization of said fourth relay after said predetermined time interval, said tip and ring conductors being open-circuited when said second relay is deenergized and said third and fourth relays are energized.

References Cited in the file of this patent

UNITED STATES PATENTS 2,763,726 Weller ---------------- Sept. 18, 1956